J. GRABOWSKI.
HORSESHOE.
APPLICATION FILED FEB. 24, 1919.
1,340,764.
Patented May 18, 1920
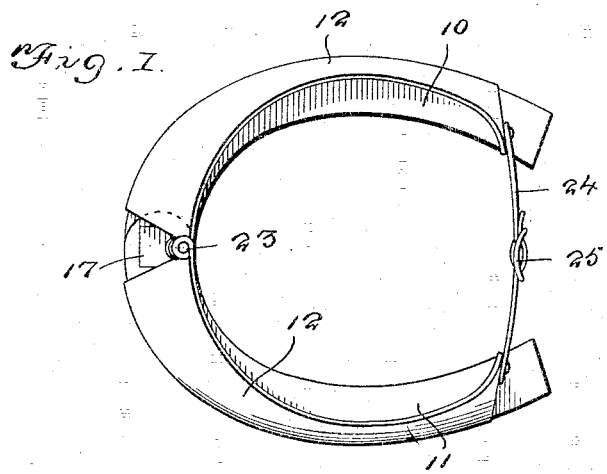
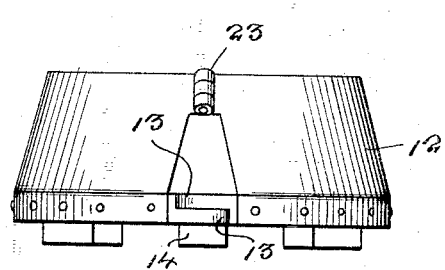
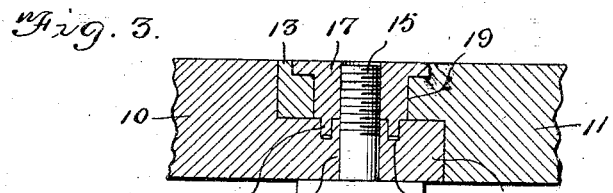
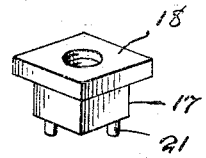
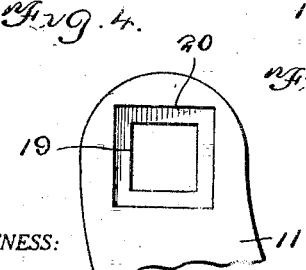
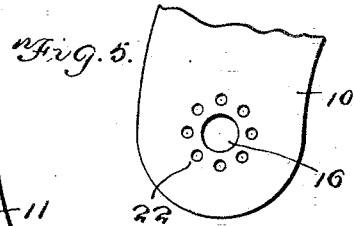
WITNESS:
E. R. Ruppert
INVENTOR.
J. Grabowski
BY
Victor J. Evans
ATTORNEY.

UNITED STATES PATENT OFFICE.

JOHN GRABOWSKI, OF BALTIMORE, MARYLAND.

HORSESHOE.

1,340,764.  Specification of Letters Patent.  Patented May 18, 1920.

Application filed February 24, 1919. Serial No. 278,891.

*To all whom it may concern:*

Be it known that I, JOHN GRABOWSKI, a citizen of the United States, residing at Baltimore, State of Maryland, have invented new and useful Improvements in Horseshoes, of which the following is a specification.

This invention relates to horseshoes, the object being to provide a shoe which is adjustable to adapt the same to horses of different sizes.

Another object of the invention is to provide a shoe which is held in place without the necessity of driving nails into the hoof of the animal, thereby avoiding injury to the horse.

With the above and other objects in view, the invention includes a sectional horseshoe having novel means for adjustably securing the sections together in a manner to fit the hoof, the shoe being provided with an upwardly extending flange which embraces the hoof, so that when the shoe is adjusted in position, it will be securely held against displacement.

Other novel features of the invention will appear as the following description is read in connection with the accompanying drawings, in which;

Figure 1 is a plan view of a horseshoe embodying the present invention.

Fig. 2 is a front elevation of the same.

Fig. 3 is an enlarged fragmentary sectional view through the toe of the shoe.

Fig. 4 is a fragmentary plan view of the inner end of one of the sections.

Fig. 5 is a similar view of the inner end of the other section.

Fig. 6 is a detail perspective view of the connecting sleeve.

Referring to the drawings in detail, wherein like characters of reference denote corresponding parts, the shoe comprises two sections 10 and 11, each of which is provided with an upwardly extending curved flange 12, adapted to embrace the hoof of the animal in a manner to prevent the removal of the shoe after the same has been placed in position. The sections are formed by dividing the shoe centrally and transversely, the inner or meeting ends of the sections being reduced, as shown at 13, to provide an overlapping joint. They are removably and adjustably held together through the medium of a removable calk 14, the shank 15 of which is threaded. This shank passes through a circular opening 16, provided in the end of the section 10 and is engageable with an interiorly threaded bore formed in a sleeve 17. This sleeve is rectangular in cross-section and is provided with a rectangular flange 18, the sleeve being receivable in a rectangular opening 19 extending transversely through the adjacent end of the section 11, while the flange is receivable in a similarly shaped opening 20, which surrounds the upper end of the opening 19. Extending from the opposite end of the sleeve 17 are lugs 21, which are adapted to engage sockets or depressions 22 disposed concentrically around the opening 16. By this means when the shank is engaged with the threaded bore of the sleeve 17, the latter will be drawn inward or toward the calk, and the lugs 21 will enter the proper sockets 22 to prevent relative movement of the sections 10 and 11, after the shoe has been adjusted to the hoof of the animal. The sections 10 and 11 may be further joined by providing a hinged connection 23 at the upper front corners of the flanges 12.

The invention is susceptible of various changes in its form, proportions and minor details of construction, and the right is herein reserved to make such changes as properly fall within the scope of the appended claims.

In order to prevent accidental removal of the shoe, the flanges 12 are connected together at their free ends through the medium of straps 24 and a buckle 25, so that after the shoe has been adjusted upon the hoof of the animal the straps may be connected to securely hold the shoe in place.

Having described the invention, what is claimed is:

1. A horseshoe constructed in two sections, an inwardly inclined curved flange carried by each section, the front meeting ends of each section being reduced to provide an overlapping joint, a toe calk having a shank removably connecting the meeting ends of the sections together, means for connecting the heel ends of the sections, and means engageable with each section and with the shank of the calk for preventing relative movement of the sections.

2. A horseshoe constructed in two sections, an inwardly inclined curved flange carried by each section, the front meeting ends of each section being reduced to provide an overlapping joint, a toe calk having a shank removably connecting the meeting ends of the sections together, means for connecting the heel ends of the sections, and means including a threaded sleeve engageable with the shank of the calk and slidable transversely and engageable with each of the sections for preventing relative movement of the latter.

3. A horseshoe constructed in two sections, an inwardly inclined curved flange carried by each section, the front meeting ends of each section being reduced to provide an overlapping joint, a toe calk having a shank removably connecting the meeting ends of the sections together, a squared sleeve having a threaded opening and engageable with a squared opening in one section, the other section having an opening therein for the passage of the threaded shank, lugs extending from the squared sleeve and engageable with depressions formed in the last-mentioned section and arranged concentrically around the opening for adjustably securing the sections together and holding them against relative movement, and means connecting the ends of the sections.

In testimony whereof I affix my signature.

JOHN GRABOWSKI.